(12) United States Patent
Sun et al.

(10) Patent No.: US 9,479,295 B2
(45) Date of Patent: Oct. 25, 2016

(54) METHOD OF IMPLEMENTING AUTOMATICALLY RETRANSMISSION FEEDBACK IN A UE IN A CARRIER AGGREGATION NETWORK

(71) Applicant: Alcatel Lucent, Boulogne Billancourt (FR)

(72) Inventors: Fanglei Sun, Shanghai (CN); Jin Liu, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 80 days.

(21) Appl. No.: 14/417,325

(22) PCT Filed: Jul. 15, 2013

(86) PCT No.: PCT/IB2013/001768
§ 371 (c)(1),
(2) Date: Jan. 26, 2015

(87) PCT Pub. No.: WO2014/020436
PCT Pub. Date: Feb. 6, 2014

(65) Prior Publication Data
US 2015/0180617 A1 Jun. 25, 2015

(30) Foreign Application Priority Data
Aug. 3, 2012 (CN) .......................... 2012 1 0276221

(51) Int. Cl.
*H04L 1/18* (2006.01)
*H04L 5/00* (2006.01)
*H04W 72/04* (2009.01)

(52) U.S. Cl.
CPC ........... *H04L 1/1861* (2013.01); *H04L 1/1854* (2013.01); *H04L 5/0055* (2013.01); *H04W 72/0446* (2013.01)

(58) Field of Classification Search
None
See application file for complete search history.

(56) References Cited

U.S. PATENT DOCUMENTS 8,885,526 B2 * 11/2014 He .................. H04L 5/1469
370/280
9,112,693 B2 * 8/2015 Yin .................. H04L 1/1861
(Continued)

FOREIGN PATENT DOCUMENTS

CN 102045140 A 5/2011
CN 102082643 A 6/2011
(Continued)

OTHER PUBLICATIONS

English Bibliography for Chinese Patent Application Publication No. CN102045140A, published May 4, 2011, printed from Thomson Innovation on Apr. 7, 2015, 4 pp.
(Continued)

*Primary Examiner* — Brian Roberts
(74) *Attorney, Agent, or Firm* — Fay Sharpe, LLP

(57) ABSTRACT

The invention proposes a method of implementing hybrid automatically retransmission feedback in a UE in a carrier aggregation network, wherein, the network comprises a self-scheduling primary cell and a secondary cell, and the method comprises: determining a reference frame configuration based on the frame configuration of the primary cell and the frame configuration of the secondary cell, wherein, the reference frame configuration is the type 5; determining a first quantity of downlink subframes of the secondary cell needing to be fed back in uplink subframes, according to the frame configuration of the secondary cell and downlink subframes, associated with uplink subframes, corresponding to the reference frame configuration; receiving from a base station a parameter about the number of downlink subframes fed back, and calculating a second quantity of downlink subframes needing to be fed back in the uplink subframes, based on the parameter; determining an actual quantity of downlink subframes actually fed back, based on the first quantity and the second quantity; implementing automatically retransmission feedback for downlink frames of the actual quantity in the physical shared channel, adjusted by uplink grants, in the uplink subframes.

15 Claims, 1 Drawing Sheet

(56) References Cited

U.S. PATENT DOCUMENTS

| 2011/0255451 | A1 | 10/2011 | Moon et al. |
| 2012/0113907 | A1 | 5/2012 | Baldemair et al. |
| 2013/0301433 | A1* | 11/2013 | Yin ............... H04W 16/02 370/252 |
| 2014/0293909 | A1 | 10/2014 | Xu et al. |

FOREIGN PATENT DOCUMENTS

| CN | 102271032 A | 12/2011 |
| WO | 2010/074472 A2 | 7/2010 |
| WO | 2012065577 A1 | 5/2012 |

OTHER PUBLICATIONS

English Bibliography for PCT Patent Application Publication No. WO2012065577A1, published May 24, 2012, printed from Thomson Innovation on Apr. 7, 2015, 3 pp.

PCT Pat. App. No. PCT/IB2013/001768, Written Opinion of the International Searching Authority, mailed Jan. 24, 2014, 6 pp.

CATT, "HARQ-ACK feedback for TDD inter-band CA," $3^{rd}$ Generation Partnership Project (3GPP), 3GPP TSG RAN WG1 Meeting #69, R1-122031, 3 pages, XP050600322, Prague, Czech Republic, May 21-25, 2012.

"$3^{rd}$ Generation Partnership Project; Technical Specification Group Radio Access Network; Evolved Universal Terrestrial Radio Access (E-UTRA); Physical layer procedures (Release 10)," DRAFT3GPP TS 36.213 Va.0.0, pp. 1-98, XP050473758, (Dec. 2010).

Samsung, "PDSCH HARQ timing for more than 2 cell configuration," $3^{rd}$ Generation Partnership Project (3GPP), 3GPP TSG RAN WG1 #69, R1-122225, pp. 1-4, XP050600489, Prague, Czech Republic, May 21-25, 2012.

ITRI, "Cross-carrier scheduling and HARQ timing for different TDD UL-DL configurations," $3^{rd}$ Generation Partnership Project (3GPP), 3GPP TSG-RAN WG1 Meeting #68bis, R1-121853, 8 pages, XP050600102, Jeju Island, Korea, Mar. 26-30, 2012.

International Search Report for PCT/IB2013/001768 dated Jan. 24, 2014.

English Bibliography for PCT Patent Application Publication No. WO2010074472A2, published Jul. 1, 2010, printed from Thomson Innovation on May 11, 2016, 6 pp.

English Bibliography for CN Patent Application Publication No. CN102271032A, published Dec. 7, 2011, printed from Thomson Innovation on May 11, 2016, 4 pp.

English Bibliography for CN Patent Application Publication No. CN102082643A, published Jun. 1, 2011, printed from Thomson Innovation on May 11, 2016, 3 pp.

* cited by examiner

METHOD OF IMPLEMENTING AUTOMATICALLY RETRANSMISSION FEEDBACK IN A UE IN A CARRIER AGGREGATION NETWORK

TECHNICAL FIELD

The invention relates to wireless communication, especially relates to hybrid automatically retransmission feedback in wireless communication.

BACKGROUND OF THE ART

In 3GPP LTE standardization process, in release 10, TDD carrier aggregation can only support using the same frame configuration of TDD uplink and downlink between different component carriers. While since release 10 evolves to release 11, TDD carrier aggregation between different frequency bands has been able to support using different frame configurations of TDD uplink and downlink between different component carriers. For A/N (ACK/NACK) bit mapping and the resource allocation used for PUCCH format 3, the standardization has reached some agreement. A UE can be configured to have PUCCH format 3 or PUCCH format 1b, and have the channel selection used for HARQ-ACK transmission.

In RAN1#68bis meeting, in the case of self-scheduling (i.e. the scheduling of downlink subframe data of a secondary cell is transmitted by the cell), the industry agrees that: the PDSCH HARQ in the secondary cell will refer to the TDD reference uplink and downlink frame configuration. As shown in the following table 1:

TABLE 1

| reference frame configuration used for PDSCH HARQ | uplink and downlink frame configuration of the secondary cell SIB1 | | | | | | |
|---|---|---|---|---|---|---|---|
| | 0 | 1 | 2 | 3 | 4 | 5 | 6 |
| uplink and downlink frame configuration of the primary cell SIB1 | 0 | 0 | 1 | 2 | 3 | 4 | 5 | 6 |
| | 1 | 1 | 1 | 2 | 4 | 4 | 5 | 1 |
| | 2 | 2 | 2 | 2 | 5 | 5 | 5 | 2 |
| | 3 | 3 | 4 | 5 | 3 | 4 | 5 | 3 |
| | 4 | 4 | 4 | 5 | 4 | 4 | 5 | 4 |
| | 5 | 5 | 5 | 5 | 5 | 5 | 5 | 5 |
| | 6 | 6 | 1 | 2 | 3 | 4 | 5 | 6 |

The table shows that when uplink and downlink frame configurations of a primary cell and a secondary cell are certain configurations respectively, which reference frame configuration it is, on which the implementation of HARQ feedback is based. E.g. when the frame configuration of a primary cell is the type 2, and the frame configuration of a secondary cell is the type 3, the reference frame configuration on which the implementation of HARQ feedback is based is the type 5.

The reference frame configuration on which HARQ feedback is based is shown in table 10.1.3.1-1 in 3GPP TS 36.213, and the following table 2 lists the table:

TABLE 2

| uplink and downlink frame configuration | subframe | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

The meaning of the table is that, for seven kinds of uplink and downlink frame configurations respectively, it regulates the HARQ-ACK transmission of which downlink subframe is carried by which uplink subframe. Taking the type 5 as an example, No. 2 subframe is the only uplink subframe, the uplink subframe is responsible for carrying the HARQ feedback of the 13th, 12th, 9th, 8th, 7th, 5th, 4th, 11th and 6th downlink subframe counted backward from the uplink subframe. This kind of relation between the uplink subframe and the downlink subframe, the HARQ feedback of which this uplink subframe carries, can also be called as association, and the set of one or multiple downlink subframes associated with a certain uplink subframe is recorded as K: $\{k_0, k_1, \ldots k_{M-1}\}$.

SUMMARY OF THE INVENTION

Currently for release 11, the agreed solution is that, for the UE configured the PUCCH format 3 used for HARQ-ACK transmission, the regulation of HARQ-ACK transmission is the same as release 10, except for the following difference:

the downlink subframe set (recorded as $K_c$) associated with the uplink subframe n comprises the downlink subframe with a serial number n–k, wherein k∈$K_c$, and $K_c$ is specified in table 2 for the reference uplink and downlink frame configuration;

for the HARQ-ACK transmission transmitted in PUCCH or PUSCH, not adjusted by UL grants, in the uplink subframe n, the quantity of downlink subframes actually fed back is $B_c^{DL}=M_c$, wherein, $M_c$ is the quantity of downlink subframes in $K_c$.

for the HARQ-ACK transmission transmitted in PUSCH, adjusted by UL grants, in the uplink subframe n, when the reference frame configuration is the type 1, type 2, type 3, type 4 or type 6, the quantity of downlink subframes actually fed back is $B_c^{DL}=\min(W_{DAI}^{UL}, M_c)$, wherein, $W_{DAI}^{UL}$ is a parameter about the number of downlink subframes fed back, from a base station, its value range is from 1 to 4, and $M_c$ is the quantity of downlink subframes in K.

Currently, for the HARQ-ACK transmission transmitted in PUSCH adjusted by UL grants in the uplink subframe n, when the reference frame configuration is the type 5, the industry hasn't agreed about what is the quantity of downlink subframes actually fed back.

And, for the HARQ-ACK transmission transmitted in PUSCH adjusted by UL grants in the uplink subframe n, when the reference frame configuration is the type 0, the industry hasn't agreed about what is the quantity of downlink subframes actually fed back.

Besides, for the case of implementing cross-CC scheduling (i.e. the scheduling information of downlink subframe data of one scheduled cell is transmitted by another scheduling cell), the industry hasn't agreed about how to implement the HARQ-ACK transmission.

In order to fill the above technology blank, according to the first aspect of the invention, a method of implementing hybrid automatically retransmission feedback in a UE in a carrier aggregation network is provided, wherein, the carrier aggregation network comprises self-scheduling a primary cell and a secondary cell, and the method comprises the following steps:

i. determining a reference frame configuration based on the frame configuration of the primary cell and the frame configuration of the secondary cell, wherein, the reference frame configuration is the type 5;

ii. determining a first quantity ($M_c$) of downlink subframes ($K_c$) of the secondary cell needing to be fed back in uplink subframes, according to the frame configuration of the secondary cell and downlink subframes, associated with uplink subframes, corresponding to the reference frame configuration;

iii. receiving from a base station a parameter ($W_{DAI}^{UL}$) about the number of downlink subframes fed back, and calculating a second quantity (N) of downlink subframes needing to be fed back in the uplink subframes, based on the parameter;

iv. determining an actual quantity ($B_c^{DL}$) of downlink subframes actually fed back, based on the first quantity ($M_c$) and the second quantity (N);

v. implementing automatically retransmission feedback for downlink frames of the actual quantity ($B_c^{DL}$), in the physical shared channel, adjusted by uplink grants, in the uplink subframes.

According to the aspect, in the case that the reference frame configuration is the type 5, it can accurately determine the quantity of downlink subframes actually needing to be fed back, fill the existing technology blank, and avoid resource waste caused by excessive subframes fed back, and also avoid the absent of HARQ information caused by much less subframes fed back.

According to the second aspect of the invention, when the reference frame configuration is the type 0, i.e. the frame configuration of the primary cell and the secondary cell both are the type 0, the invention proposes to continue using the HARQ-ACK transmission design of release 10.

According to the third aspect of the invention, a method of implementing hybrid automatically retransmission feedback in a UE in a carrier aggregation network is proposed, wherein, the carrier aggregation network comprises a scheduling cell and a scheduled cell, and the method comprises the following steps:

i. determining downlink subframes needing to be fed back in uplink subframes and a first quantity of the downlink subframes that can be fed back, based on the frame configuration of the scheduling cell and the frame configuration of the scheduled cell;

ii. implementing hybrid automatically retransmission feedback for the downlink subframes of the scheduled cell, in the uplink subframes, based on the downlink subframes to be fed back and the first quantity.

This aspect provides the technical solution of implementing automatically retransmission feedback for the downlink subframe of the scheduled secondary cell when implementing cross-CC scheduling, and fills the existing technology blank.

In a preferred embodiment, the scheduling cell is a primary cell, the scheduled cell is a secondary cell, the step i comprises the following steps:

determining downlink subframes associated with uplink subframes, corresponding to the frame configuration of the primary cell;

determining subframes as the downlink subframes ($K_c'$) needing to be fed back, which are downlink both in the frame configuration of the secondary cell and in the downlink subframes associated with uplink subframes corresponding to the frame configuration of the primary cell.

The preferred embodiment proposes, in the case that the scheduling cell is a primary cell and the scheduled cell is a secondary cell, the HARQ-ACK transmission of the scheduled cell should be based on the HARQ-ACK configuration of the primary cell and should further be unified with downlink subframes of the secondary cell.

Further, for the PUCCH or the PUSCH not adjusted by uplink grants, in the step ii:

taking the first quantity ($M_c'$) of the downlink subframes ($K_c'$) needing to be fed back as the actual quantity ($B_c^{DL}$) of the downlink subframes actually fed back;

implementing automatically retransmission feedback for the downlink subframes of the actual quantity ($B_c^{DL}$), in the physical uplink control channel or the physical uplink shared channel not adjusted by the uplink grant in the uplink subframes.

For the PUSCH adjusted by uplink grants, and the frame configuration of the primary cell is any of the following: type 0, type 1, type 2, type 3, type 4 and type 6;

the method further comprises the following steps:

receiving from a base station a parameter ($W_{DAI}^{UL}$) about the number of downlink subframes fed back;

in the step ii:

taking the smaller value of the first quantity ($M_c'$) and the parameter ($W_{DAI}^{UL}$) as the actual quantity ($B_c^{DL}$) of the downlink subframes actually fed back;

implementing automatically retransmission feedback for downlink subframes of the actual quantity ($B_c^{DL}$) in the physical uplink shared channel adjusted by the uplink grant.

And for the PUSCH adjusted by uplink grants, and the frame configuration of the scheduling cell is the type 5, the method further comprises the following steps:

receiving from a base station a parameter ($W_{DAI}^{UL}$) about the number of downlink subframes fed back, and calculating a second quantity (N') of downlink subframes to be fed back in the uplink subframes based on the parameter;

in the step ii:

determining the actual quantity ($B_c^{DL}$) of downlink subframes actually fed back, based on the first quantity ($M_c'$) and the second quantity (N');

implementing hybrid automatically retransmission feedback for downlink subframes of the actual quantity ($B_c^{DL}$), in the physical uplink shared channel adjusted by the uplink grant.

The above three technical solutions further propose the detailed solution to implement hybrid automatically retransmitting under different conditions.

In another preferred embodiment, the scheduling cell is a scheduling secondary cell, the adjusted cell is a scheduled secondary cell, the step i comprises the following steps:

determining a reference frame configuration, based on the frame configuration of the primary cell and the frame configuration of the scheduling secondary cell;

determining the subframe as the downlink subframes ($K_c''$) needing to be fed back, which are downlink both according to the downlink subframes associated with uplink subframes corresponding to the reference frame configuration, and according to the frame configuration of the scheduling secondary cell and the frame configuration of the adjusted secondary cell, and determining the first quantity ($M_c''$) of the downlink subframes ($K_c''$) needing to be fed back.

The preferred embodiment proposes, in the case that the scheduling cell is a secondary cell and the scheduled cell is a secondary cell, the HARQ-ACK transmission of the scheduled secondary cell should be based on the reference configuration of the scheduling secondary cell and should further be unified with downlink subframes of the scheduling secondary cell and the scheduled secondary cell, wherein, the reference frame configuration is the frame configuration unified between the scheduling secondary cell and the primary cell.

While for the technical solution of implementing hybrid automatically retransmission feedback to the downlink subframes of scheduling secondary cell in implementing scheduling for cross-CC, in the fourth aspect of the invention, a method of implementing hybrid automatically retransmission feedback in a UE in a carrier aggregation network is proposed, the method comprises the following steps:

a. determining a reference frame configuration, based on the frame configuration of the primary cell and the frame configuration of the scheduling secondary cell;

b. determining the downlink subframes ($K_c$) that can be fed back in uplink subframes, according to downlink subframes associated with uplink subframes corresponding to the reference frame configuration and the frame configuration of the scheduling secondary cell;

c. implementing automatically retransmission feedback for the downlink subframes of the scheduling secondary cell in uplink subframes, based on the downlink subframes that can be fed back and a third quantity ($M_c'''$) of the downlink subframes.

In the fourth aspect, it proposes hybrid automatically retransmission feedback of the scheduling secondary cell should be based on the HARQ-ACK transmission of the primary cell and should be the unified with the downlink subframe of the scheduling primary cell.

The advantages of the invention is to fill the blank in the current technology, and to provide detailed solutions of hybrid automatically retransmission feedback in the several cases that are not yet specified, which makes UEs can accurately determine the quantity of downlink subframes actually needing to be fed back and avoid resource waste and insufficient feedback.

BRIEF DESCRIPTION OF THE DRAWINGS

By reading the detailed description for unlimited embodiments by referring the following attached drawings, other features, purposes and advantages of the invention will be clearer.

DETAILED EMBODIMENT

Embodiment 1

Figure 1:
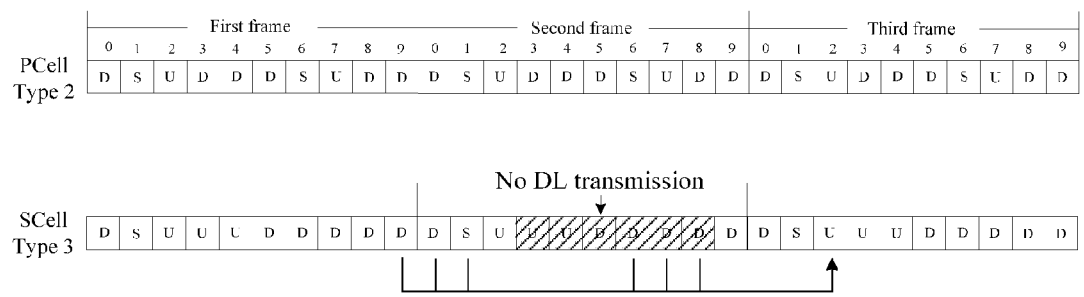
FIG. 1 is a schematic diagram of the uplink subframe implementing hybrid automatically retransmission feedback for the downlink subframe of a secondary cell, in the case of self-scheduling, according to an embodiment of the invention.

According to an embodiment of the invention, a method of implementing hybrid automatically retransmission feedback in a UE in a carrier aggregation network is provided, wherein, the carrier aggregation network comprises self-scheduling a primary cell and a secondary cell, and the method comprises the following steps:

i. determining a reference frame configuration based on the frame configuration of the primary cell and the frame configuration of the secondary cell, wherein, the reference frame configuration is the type 5;

ii. determining a first quantity $M_c$ of downlink subframes $K_c$ of the secondary cell needing to be fed back in uplink subframes, according to the frame configuration of the secondary cell and downlink subframes, associated with uplink subframes, corresponding to the reference frame configuration;

iii. receiving from a base station a parameter $W_{DAI}^{UL}$ about the number of downlink subframes fed back, and calculating a second quantity N of downlink subframes needing to be fed back in the uplink subframes, based on the parameter;

iv. determining an actual quantity $B_c^{DL}$ of downlink subframes actually fed back, based on the first quantity $M_c$ and the second quantity N;

v. implementing automatically retransmission feedback for downlink frames of the actual quantity $B_c^{DL}$, in the physical shared channel, in the uplink subframes, adjusted by uplink grants.

In detail, in the carrier aggregation between different frequency bands being able to have different frame configurations, the reference frame configuration of the secondary cell will be determined according to the foregoing table 1.

When the reference frame configuration of a certain secondary cell is the type 5, combined with the specification of table 2, A/N feedback bits of the 13th, 12th, 9th, 8th, 7th, 5th, 4th, 11th, and 6th downlink subframe before the second uplink subframe should be carried by the second uplink subframe.

Since in the frame configuration of the secondary cell, the 13th, 12th, 9th, 8th, 7th, 5th, 4th, 11th, 6th subframes before the second uplink subframe are not necessarily downlink subframes, i.e. not necessarily needing to implement A/N feedback, thus, it should determine the actual downlink subframes of the secondary cell in the 13th, 12th, 9th, 8th, 7th, 5th, 4th, 11th, 6th subframes before the second uplink subframe, according to the actual frame configuration of the secondary cell, i.e. the downlink subframes of the secondary cell being able to implement feedback, recorded as $K_c$, whose subframe quantity is $M_c$.

And, for a primary cell and a secondary cell respectively, the UE receives the physical downlink shared channel and physical downlink control channel, and thus determines respectively the quantity $U_c$ of downlink subframes needing to feed back, respectively of the primary cell and the secondary cell. And, the UE determines the maximum U in the quantity $U_c$ of downlink subframes needing to feed back, of the primary cell and the secondary cell respectively.

The UE extracts the parameter $W_{DAI}^{UL}$ from the DCI 0/4 field of the uplink grant, and calculates the second quantity N according to the parameter $W_{DAI}^{UL}$ and the maximum quantity U. Specially, N is calculated according to the following formula:

$$W_{DAI}^{UL}+4\lceil(U-W_{DAI}^{UL})/4\rceil,$$

wherein, $\lceil \ \rceil$ is ceiling function symbol.

Then, the UE takes the smaller value of the first quantity $M_c$ and the second quantity N as the actual quantity $B_c^{DL}$, i.e. $B_c^{DL}=\min(W_{DAI}^{UL}+4\lceil(U-W_{DAI}^{UL})/4\rceil, M_c)$.

When implementing hybrid automatically retransmission feedback, the UE implements automatically retransmission feedback for downlink frames of the actual quantity $B_c^{DL}$ in the physical shared channel, adjusted by uplink grants, in the uplink subframes.

The following will describe the above embodiment combined with a detailed example.

As shown in FIG. 1, the frame configuration of the primary cell is the type 2, the frame configuration of the secondary cell is the type 3. According to table 1, the HARQ-ACK for the secondary cell should meet the type 5, i.e. the reference frame configuration of the secondary cell is the type 5.

The HARQ-ACK transmission is scheduled in the uplink subframe #2 of the third frame. The downlink subframe set $K_c$ associated with the uplink subframe #2 includes the downlink subframe with serial number n–k, wherein k∈K, and K is the item {13, 12, 9, 8, 7, 5, 4, 11, 6} corresponding to the uplink subframe #2 of the type 5 in table 2. In FIG. 1, the 13th, 12th, 9th, 8th, 7th, 5th, 4th, 11th, 6th subframes before the uplink subframe #2 of the third frame are marked with oblique lines.

Next, according to the frame configuration type 3 of the secondary cell, it determines that in these subframes, the previous 13th, 12th, and 11th and the previous 7th, 6th, 5th, and 4th subframes are downlink subframes, the automatically retransmission feedback of the seven downlink subframes should be fed back in the uplink subframe #2 of the third frame, shown as the lines in FIG. 1, and they constitute the set $K_c$. Thus, based on the type 5 of the time slot configuration, the first quantity $M_c$ of the downlink subframe $K_c$ of the secondary cell that can be fed back in the uplink subframe #2 of the third frame, is 7.

And, the HARQ-ACK transmission is scheduled by the uplink grant into the PUSCH of the uplink subframe #2 of the third frame, and the MSB and LSB of the DCI 0/4 in the uplink grant are 10, i.e. representing the parameter, transmitted from a base station, about the number of downlink subframes fed back is $W_{DAI}^{UL}=2$.

In the actual communication, on the side of UEs, for the communication of a primary cell, it receives four downlink subframes, and $U_1=4$; for the communication of a secondary cell, as shown in FIG. 1, the 7th downlink subframe before the uplink subframe #2 of the third frame does not have downlink transmission, the UE successfully receives the communication of other six downlink subframes, and $U_2=6$. Then, U=max {4,6}=6, and the UE can calculate to obtain the second quantity $N=W_{DAI}^{UL}+4\lceil(U-W_{DAI}^{UL})/4\rceil=6$.

Finally, base on the embodiment of the invention, the actual quantity of downlink subframes actually fed back is $$B_c^{DL}=\min(W_{DAI}^{UL}+4\lceil(U-W_{DAI}^{UL})/4\rceil,M_c)=\min\{6,7\}=6.$$

The embodiment of the invention can accurately determine the quantity of downlink subframes actually fed back in the PUSCH, without needing other redundant feedback.

Embodiment 2

For the case of implementing cross-CC scheduling, in the case that the secondary cell is scheduled by the primary cell, the technical solution proposed by the inventor is that the hybrid automatically retransmission feedback of downlink subframes of the secondary cell should complies with the feedback configuration of the primary cell.

According to the second embodiment of the invention, a method of implementing automatically retransmission feedback in a UE in a carrier aggregation network is provided, wherein, the carrier aggregation network comprises a scheduling cell and a scheduled cell, the scheduling cell is a primary cell, the scheduled cell is a secondary cell, and the method comprises the following steps:

i. determining downlink subframes needing to be fed back in uplink subframes and a first quantity of the downlink subframes that can be fed back, based on the frame configuration of the scheduling cell and the frame configuration of the scheduled cell, wherein, the step i comprises the following steps:

determining downlink subframes associated with uplink subframes, corresponding to the frame configuration of the primary cell;

determining subframes as the downlink subframes needing to be fed back, which are downlink both in the frame configuration of the secondary cell and in the downlink subframes associated with uplink subframes corresponding to the frame configuration of the primary cell.

ii. implementing hybrid automatically retransmission feedback for the downlink subframes of the scheduled cell, in the uplink subframes, based on the downlink subframes to be fed back and the first quantity.

In detail, for the UE configured with the PUCCH format 3 used for the HARQ-ACK transmission, the HARQ-ACK transmission should continue using the regulation of release 10, except for the following each items:

for the uplink subframe n, the downlink subframe set $K_c'$ that can be fed back are the subframes belonging to downlink subframes in the frame configuration of a secondary cell, and its serial number is n–k, k∈$K_c'$, wherein, $K_c'$ is the item corresponding to the uplink subframe n, complying with the frame configuration of the primary cell in the above table 2, i.e. the downlink subframe set $K_c'$ that can be fed back is: the downlink subframe associated with the uplink subframe n in the frame configuration of a primary cell, which is unifiedly being downlink subframe with respect to the frame configuration of a secondary cell;

for the HARQ-ACK transmitted in PUCCH or PUSCH, not adjusted by UL grants, in the uplink subframe n, the actual quantity $B_c^{DL}$ of downlink subframes actually fed back is the quantity $M_c'$ of downlink subframes in the downlink subframe set $K_c$ that can be fed back, i.e. $B_c^{DL}=M_c'$.

for the HARQ-ACK transmitted in PUSCH adjusted by UL grants in the uplink subframe n, when the frame configuration of the primary cell is the type 0, type 1, type 2, type 3, type 4 or type 6, the quantity of downlink subframes actually fed back is $B_c^{DL}=\min(W_{DAI}^{UL},M_c)$, wherein, $W_{DAI}^{UL}$ is a parameter about the number of downlink subframes fed back, from a base station, the value range is from 1 to 4, and $M_c'$ is the quantity of downlink subframes in $K_c'$.

for the HARQ-ACK transmitted in PUSCH adjusted by UL grants in the uplink subframe n, when the frame configuration of the primary cell is the type 5, the quantity of downlink subframes actually fed back is $B_c^{DL}=\min(W_{DAI}^{UL}+4\lceil(U-W_{DAI}^{UL})/4\rceil,M_c')$, wherein, U is a maximum quantity in the quantities $U_c$ of the downlink subframes needing to be fed back for the primary cell and the secondary cell respectively.

The following will describe the above embodiment combined with a detailed example.

Figure 2:
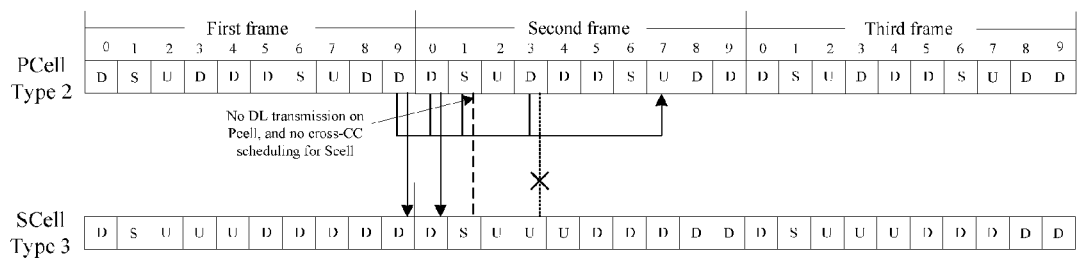
FIG. 2 is a schematic diagram of the uplink subframe implementing hybrid automatically retransmission feedback to the downlink subframe of a scheduled cell, in the case of cross-CC scheduling, according to another embodiment of the invention.

As shown in FIG. 2, the frame configuration of the primary cell and secondary cell are unified with those in FIG. 1, the frame configuration of the primary cell is the type 2, and the frame configuration of the secondary cell is the type 3. For the #7 uplink subframe of the second subframe, the downlink subframe set $K_c$ associated with it includes the downlink subframe which serial number is n–k, wherein k∈K, and K is the item {8, 7, 4, 6} corresponding to the uplink subframe #7 of the type 2 in table 2. As shown in FIG. 1, the 8th, 7th, 4th, 6th subframes before the uplink subframe #7 of the second frame are marked with lines.

When cross-CC scheduling, only when the subframes of the scheduling cell and the scheduled cell are both downlink subframes, the scheduling cell can schedule the downlink transmission in the scheduled cell. Thus, it should determine the actual downlink subframes of the secondary cell in the previous 8th, 7th, 4th, 6th subframes of the uplink subframe #7, according to the actual frame configuration of the secondary cell, i.e. the downlink subframes of the secondary cell that can be fed back, recorded as $K_c'$, and its subframe quantity $M_c'$. As shown in FIG. 2, for the previous 4th subframe of the uplink subframe #7, the scheduled cell is not a downlink subframe. Thus, the downlink subframe $K_c'$ of the secondary cell that can be fed back is the previous 8th, 7th, 6th subframes of the uplink subframe #7, as shown in FIG. 2, $M_c'$ is 3.

Next, if the HARQ-ACK transmitted in the uplink subframe #7 of the second frame is transmitted in the PUCCH or the PUSCH not adjusted by UL grants, the actual quantity $B_c^{DL}$ of downlink subframes actually fed back is the quantity $M_c'$ of downlink subframes in the downlink subframe set $K_c$ that can be fed back, i.e. $BL_c^{DL}=M_c'=3$.

If the HARQ-ACK transmitted in the uplink subframe #7 of the second frame is transmitted in the PUSCH adjusted by UL grants, we set up the following scenario: in the subframe #9 of the first frame and the subframe #0 of the second frame, cross-CC scheduling the UE to receive the PUCCH or PDSCH needing automatically retransmission feedback in these subframes of the scheduled cell, and the scheduling cell doesn't have a downlink transmission in the subframe #1 of the second frame, as shown in FIG. 1, i.e. not cross-CC scheduling the UE to receive the PUCCH or PDSCH in this subframe of the scheduled cell, thus $W_{DAI}^{UL}=2$ transmitted by the base station, i.e. indicating that the UE needs to transmit the automatically retransmission feedback of the subframe #9 of the first frame and the subframe #0 of the second frame. Thus, according to the embodiment of the invention, $B_c^{DL}=\min(W_{DAI}^{UL},M_c')=\min(2,3)=2$.

Embodiment 3

For the case of implementing cross-CC scheduling, in the case that the secondary cell is scheduled by another secondary cell, the technical solution proposed by the inventor is that for the scheduling secondary cell, its automatically retransmission feedback for downlink subframes should complies with the reference configuration based on the primary cell and the scheduling secondary cell, and considers the downlink subframe location of the scheduled secondary cell; while for the scheduled secondary cell, its automatically retransmission feedback for downlink subframes should complies with the reference configuration based on the primary cell and the scheduling secondary cell, and considers the downlink subframe location of the scheduling secondary cell and the scheduled secondary cell. In detail:

For implementing hybrid automatically retransmission feedback for downlink subframes of the scheduling secondary cell, the invention proposes a method of implementing hybrid automatically retransmission feedback in a UE in a carrier aggregation network, wherein, the carrier aggregation network comprises a scheduling secondary cell, the method implements automatically retransmission feedback for downlink frames of the scheduling secondary cell, wherein, the method comprises the following steps:

a. determining a reference frame configuration, based on the frame configuration of the primary cell and the frame configuration of the scheduling secondary cell;

b. determining the downlink subframes $K_c'''$ that can be fed back in uplink subframes, according to downlink subframes associated with uplink subframes corresponding to the reference frame configuration and the frame configuration of the scheduling secondary cell;

c. implementing automatically retransmission feedback for the downlink subframes of the scheduling secondary cell in uplink subframes, based on the downlink subframes that can be fed back and a third quantity $M_c'''$ of the downlink subframes.

Wherein, when needing to transmit a HARQ-ACK in the PUSCH adjusted by uplink grants, and the reference frame configuration is the type 5, in the step b, determining the subframes as the downlink subframes needing to be fed back, which are both downlink in the frame configuration of the secondary cells and in downlink subframes associated with uplink subframes corresponding to the reference frame configuration, The method further comprises the following steps:
receiving from a base station a parameter $W_{DAI}^{UL}$ about the number of downlink subframes fed back, and calculating a fourth quantity $N'''$ of downlink subframes to be fed back in the uplink subframes based on the parameter;

in the step c:
taking the smaller value of the third quantity $M_c'''$ and the fourth quantity $N'''$ as the actual quantity $B_c^{DL}$ of downlink subframes actually fed back;
implementing automatically retransmission feedback for the downlink subframes of the actual quantity $B_c^{DL}$, in the physical uplink shared channel adjusted by the uplink grant;

wherein, the fourth quantity $N'''$ is calculated according to the following formula:

$$W_{DAI}^{UL}+4[(U-W_{DAI}^{UL})/4],$$

wherein, $W_{DAI}^{UL}$ is the parameter, and U is the maximum quantity in the quantities of downlink subframes needing to be fed back for the primary cell and the scheduling secondary cell.

When needing to transmit a HARQ-ACK in the PUSCH adjusted by uplink grants, and the reference frame configuration is any of the following:
type 0; type 1, type 2, type 3, type 4 and type 6;
the method further comprises the following steps:
receiving from a base station a parameter $W_{DAI}^{UL}$ about the number of downlink subframes fed back;
in the step c:
taking the smaller value of the third quantity $M_c'''$ and the parameter $W_{DAI}^{UL}$ as the actual quantity $B_c^{DL}$ of downlink subframes actually fed back;

implementing automatically retransmission feedback for downlink subframes of the actual quantity $B_c^{DL}$ in the physical uplink shared channel adjusted by the uplink grant.

When needing to transmit a HARQ-ACK in the PUCCH or the PUSCH not adjusted by uplink grants, in the step c:

taking the third quantity $M_c'''$ as the actual quantity $B_c^{DL}$ of downlink subframes actually fed back;

implementing automatically retransmission feedback for downlink subframes of the actual quantity $B_c^{DL}$ in the physical uplink control channel or the physical uplink shared channel not adjusted by the uplink grant of the uplink subframe.

For implementing hybrid automatically retransmission feedback for downlink subframes of the scheduled secondary cell, the technical solution proposed by the invention is that: the automatically retransmission feedback of downlink subframes of the secondary cell should complies with the reference frame configuration of the scheduling secondary cell.

In detail, according to the second embodiment of the invention, a method of implementing automatically retransmission feedback in a UE in a carrier aggregation network is provided, wherein, the carrier aggregation network comprises a scheduling cell and a scheduled cell, the scheduling cell is a primary cell, the scheduled cell is a secondary cell, and the method comprises the following steps:

i. determining downlink subframes needing to be fed back in uplink subframes and a first quantity of the downlink subframes that can be fed back, based on the frame configuration of the scheduling cell and the frame configuration of the scheduled cell, wherein, comprising:

determining a reference frame configuration, based on the frame configuration of the primary cell and the frame configuration of the scheduling secondary cell;

determining the subframe as the downlink subframes $K_c''$ needing to be fed back, which are downlink both according to the downlink subframes associated with uplink subframes corresponding to the reference frame configuration, and according to the frame configuration of the scheduling secondary cell and the frame configuration of the adjusted secondary cell, and determining the first quantity $M_c'$ of the downlink subframes $K_c''$ needing to be fed back.

ii. implementing hybrid automatically retransmission feedback for the downlink subframes of the scheduled cell, in the uplink subframes, based on the downlink subframes $K_c''$ to be fed back and the first quantity $M_c''$.

In principle, after determining the downlink subframes $K_c''$ needing to be fed back, and determining the first quantity $M_c''$ of the downlink subframes $K_c''$ needing to be fed back, for various cases of implementing feedback in the PUCCH or PUSCH, the operation the UE implementing is similar with the embodiment 2.

In detail, for implementing automatically retransmission feedback in the PUCCH or the PUSCH not adjusted by uplink grants:

taking the first quantity $M_c''$ as the actual quantity $B_c^{DL}$ of the downlink subframes actually fed back;

implementing automatically retransmission feedback for the downlink subframes of the actual quantity $B_c^{DL}$, in the physical uplink control channel or the physical uplink shared channel not adjusted by the uplink grant in the uplink subframes.

For implementing automatically retransmission feedback in the PUSCH adjusted by uplink grants, and the reference frame configuration is any of the following:

type 0, type 1, type 2, type 3, type 4 and type 6;

the method further comprises the following steps:

receiving from a base station a parameter $W_{DAI}^{UL}$ about the number of downlink subframes fed back;

in the step ii:

taking the smaller value of the first quantity $M_c''$ and the parameter $W_{DAI}^{UL}$ as the actual quantity $B_c^{DL}$ of the downlink subframes actually fed back;

implementing automatically retransmission feedback for downlink subframes of the actual quantity $B_c^{DL}$ in the physical uplink shared channel adjusted by the uplink grant.

While implementing automatically retransmission feedback in the PUSCH adjusted by uplink grants, and the reference frame configuration is the type 5, the method further comprises the following steps:

receiving from a base station a parameter $W_{DAI}^{UL}$ about the number of downlink subframes fed back, and calculating a second quantity $N''$ of downlink subframes to be fed back in the uplink subframes based on the parameter;

in the step ii:

taking the smaller value of the first quantity $M_c''$ and the second quantity $N''$ as the actual quantity $B_c^{DL}$ of downlink subframes actually fed back;

implementing automatically retransmission feedback for downlink subframes of the actual quantity $B_c^{DL}$, in the physical uplink shared channel adjusted by the uplink grant in the uplink subframes;

wherein, the second quantity $N''$ is calculated according to the following formula:

$$W_{DAI}^{UL}+4[(U-W_{DAI}^{UL})/4],$$

wherein, $W_{DAI}^{UL}$ is the parameter, and U is the maximum quantity in the quantities of downlink subframes needing to be fed back for the primary cell and the secondary cell.

It needs to explain that, in the case of non-conflict, the embodiments in the application and the features in the embodiments may be combined with each other in any way.

Certainly, there are other multiple embodiments in the invention, without departing from the spirit and essence of the invention, the technicians familiar with the field may make various kinds of corresponding changes and deformations according to the invention, while the corresponding changes and deformations should belong to the protect range of the claims attached by the invention.

The ordinary technicians in the field may understand all or partial steps in the above methods can be realized through programs instructing related hardware to implement, the programs may be stored in readable storage medium of a computer, e.g. a read-only memory, disk or CD-ROM etc. Optionally, all or partial steps in the above embodiments may use one or multiple integrated circuits to implement. Correspondingly, each module/unit in the above embodiments may either take the hardware form to realize, or take the form of software function module to achieve. The invention isn't limited to any specific forms of combination of hardware and software.

What is claimed is:

1. A method of implementing hybrid automatically retransmission feedback in a UE in a carrier aggregation network, wherein, the carrier aggregation network comprises a self-scheduling primary cell and a secondary cell, and the method comprises:

determining a reference frame configuration based on the frame configuration of the primary cell and the frame configuration of the secondary cell, wherein, the reference frame configuration is the type 5;

determining a first quantity ($M_c$) of downlink subframes ($K_c$) of the secondary cell needing to be fed back in uplink subframes, according to the frame configuration of the secondary cell and downlink subframes, associated with uplink subframes, corresponding to the reference frame configuration;

receiving from a base station a parameter ($W_{DAI}^{UL}$) about the number of downlink subframes fed back, and calculating a second quantity (N) of downlink subframes needing to be fed back in the uplink subframes, based on the parameter;

determining an actual quantity ($B_c^{DL}$) of downlink subframes actually fed back, based on the first quantity ($M_c$) and the second quantity (N);

implementing automatically retransmission feedback for downlink frames of the actual quantity ($B_c^{DL}$) in the physical shared channel, adjusted by uplink grants, in the uplink subframes.

2. A method of claim 1, wherein, in the determining a first quantity, determining the subframes in the frame configuration of the secondary cell, and the downlink subframes associated with uplink subframes corresponding to the reference frame configuration, which are both downlink, as the downlink subframe needing to be fed back, in the receiving, for the primary cell and the secondary cell respectively, receiving the physical downlink shared channel and physical downlink control channel, and determining a quantity ($U_c$) of downlink subframes needing to be fed back for the primary cell and the secondary cell respectively;

determining a maximum quantity (U) in the quantities ($U_c$) of the downlink subframes needing to be fed back for the primary cell and the secondary cell respectively; and in the receiving, calculating the second quantity (N) based on the parameter ($W_{DAI}^{UL}$) and the maximum quantity (U).

3. A method of claim 2, wherein, in the receiving, extracting the parameter ($W_{DAI}^{UL}$) from the DCI 0/4 field of the uplink grant, and calculating the second quantity (N) according to the following formula:

$$W_{DAI}^{UL} + 4\lceil (U - W_{DAI}^{UL})/4 \rceil,$$

wherein, $W_{DAI}^{UL}$ is the parameter, and U is the maximum quantity in the quantities of downlink subframes needing to be fed back for the primary cell and the secondary cell, and in the determining an actual quantity, taking the smaller value of the first quantity ($M_c$) and the second quantity (N) as the actual quantity ($B_c^{DL}$).

4. A method of implementing hybrid automatically retransmission feedback in a UE in a carrier aggregation network, wherein, the carrier aggregation network comprises a scheduling cell and a scheduled cell, and the method comprises:

determining downlink subframes needing to be fed back in uplink subframes and a first quantity of the downlink subframes that can be fed back, based on the frame configuration of the scheduling cell and the frame configuration of the scheduled cell;

implementing hybrid automatically retransmission feedback for the downlink subframes of the scheduled cell, in the uplink subframes, based on the downlink subframes to be fed back and the first quantity.

5. A method of claim 4, wherein, the scheduling cell is a primary cell, the scheduled cell is a secondary cell, the determining comprises:

determining downlink subframes associated with uplink subframes, corresponding to the frame configuration of the primary cell;

determining subframes as the downlink subframes ($K_c'$) needing to be fed back, which are downlink both in the frame configuration of the secondary cell and in the downlink subframes associated with uplink subframes corresponding to the frame configuration of the primary cell, in the implementing:

taking the first quantity ($M_c'$) of the downlink subframes ($K_c'$) needing to be fed back as the actual quantity ($B_c^{DL}$) of the downlink subframes actually fed back;

implementing automatically retransmission feedback for the downlink subframes of the actual quantity ($B_c^{DL}$), in the physical uplink control channel or the physical uplink shared channel, not adjusted by the uplink grant, in the uplink subframes.

6. A method of claim 5, wherein, the frame configuration of the primary cell is any of the following:

type 0, type 1, type 2, type 3, type 4 and type 6;

the method further comprises:

receiving from a base station a parameter ($W_{DAI}^{UL}$) about the number of downlink subframes fed back;

and in the implementing:

taking the smaller value of the first quantity ($M_c'$) and the parameter ($W_{DAI}^{UL}$) as the actual quantity ($B_c^{DL}$) of the downlink subframes actually fed back;

implementing automatically retransmission feedback for downlink subframes of the actual quantity ($B_c^{DL}$) in the physical uplink shared channel adjusted by the uplink grant.

7. A method of claim 5, wherein, the frame configuration of the scheduling cell is the type 5, the method further comprises:

receiving from a base station a parameter ($W_{DAI}^{UL}$) about the number of downlink subframes fed back, and calculating a second quantity (N') of downlink subframes to be fed back in the uplink subframes based on the parameter;

and in the implementing:

determining the actual quantity ($B_c^{DL}$) of downlink subframes actually fed back, based on the first quantity ($M_c'$) and the second quantity (N');

implementing automatically retransmission feedback for downlink subframes of the actual quantity ($B_c^{DL}$), in the physical uplink shared channel adjusted by the uplink grant.

8. A method of claim 5, wherein, in the calculating the second quantity (N):

for a primary cell and a secondary cell respectively, receiving the physical downlink shared channel and physical downlink control channel, and determining the quantity ($U_c$) of downlink subframes needing to be fed back for the primary cell and the secondary cell respectively;

determining the maximum quantity (U) in the quantities ($U_c$) of downlink subframes needing to be fed back for the primary cell and the secondary cell respectively;

calculating the second quantity (N) based on the parameter ($W_{DAI}^{UL}$) and the maximum quantity (U), the second quantity (N) being calculated according to the following formula:

$$W_{DAI}^{UL}+4[(U-W_{DAI}^{UL})/4],$$

wherein, $W_{DAI}^{UL}$ is the parameter, and U is the maximum quantity in the quantities of downlink subframes needing to be fed back for the primary cell and the secondary cell,
in the implementing, taking the smaller value of the first quantity ($M_c'$) and the second quantity (N') as the actual quantity ($B_c^{DL}$).

9. A method of claim 4, wherein, the scheduling cell is a scheduling secondary cell, the scheduled cell is a scheduled secondary cell,
the determining comprises:
determining a reference frame configuration, based on the frame configuration of the primary cell and the frame configuration of the scheduling secondary cell;
determining the subframe as the downlink subframes ($K_c''$) needing to be fed back, which are downlink both according to the downlink subframes associated with uplink subframes corresponding to the reference frame configuration, and according to the frame configuration of the scheduling secondary cell and the frame configuration of the scheduled secondary cell, and determining the first quantity ($M_c''$) of the downlink subframes ($K_c''$) needing to be fed back.

10. A method of claim 9, further comprising:
taking the first quantity ($M_c''$) as the actual quantity ($B_c^{DL}$) of the downlink subframes actually fed back; and
implementing automatically retransmission feedback for the downlink subframes of the actual quantity ($B_c^{DL}$), in the physical uplink control channel of the uplink subframes or the physical uplink shared channel, not adjusted by the uplink grant, in the uplink subframes.

11. A method of claim 9, wherein, the reference frame configuration is any of the following:
type 0, type 1, type 2, type 3, type 4 and type 6;
the method further comprises:
receiving from a base station a parameter ($W_{DAI}^{UL}$) about the number of downlink subframes fed back;
and in the implementing:
taking the smaller value of the first quantity ($M_c''$) and the parameter ($W_{DAI}^{UL}$) as the actual quantity ($B_c^{DL}$) of downlink subframes actually fed back; and
implementing automatically retransmission feedback for downlink subframes of the actual quantity ($B_c^{DL}$) in the physical uplink shared channel adjusted by the uplink grant.

12. A method of claim 9, wherein, the reference frame configuration is the type 5,
the method further comprises:
receiving from a base station a parameter ($W_{DAI}^{UL}$) about the number of downlink subframes fed back, and calculating a second quantity (N'') of downlink subframes to be fed back in the uplink subframes based on the parameter;
and in the implementing:
taking the smaller value of the first quantity ($M_c''$) and the second quantity (N'') as the actual quantity ($B_c^{DL}$) of downlink subframes actually fed back;
implementing automatically retransmission feedback for downlink subframes of the actual quantity ($B_c^{DL}$), in the physical uplink shared channel, adjusted by the uplink grant, in the uplink subframes;
wherein, the second quantity (N'') is calculated according to the following formula:

$$W_{DAI}^{UL}+4[(U-W_{DAI}^{UL})/4],$$

wherein, $W_{DAI}^{UL}$ is the parameter, and U is the maximum quantity in the quantities of downlink subframes needing to be fed back for the primary cell and the secondary cell.

13. A method of implementing hybrid automatically retransmission feedback in a UE in a carrier aggregation network, wherein, the carrier aggregation network comprises a scheduling secondary cell, the method implements automatically retransmission feedback for downlink frames of the scheduling secondary cell, wherein, the method comprises:
determining a reference frame configuration, based on the frame configuration of the primary cell and the frame configuration of the scheduling secondary cell;
determining the downlink subframes ($K_c$) that can be fed back in uplink subframes, according to downlink subframes associated with uplink subframes corresponding to the reference frame configuration and according to the frame configuration of the scheduling secondary cell;
implementing automatically retransmission feedback for the downlink subframes of the scheduling secondary cell in uplink subframes, based on the downlink subframes that can be fed back and a third quantity ($M_c'''$) of the downlink subframes ($M_c'''$).

14. A method of claim 13, wherein, the reference frame configuration is the type 5,
in the determining the downlink subframes, determining the subframes as the downlink subframes needing to be fed back, which are both downlink in the frame configuration of the secondary cells and in downlink subframes associated with uplink subframes corresponding to the reference frame configuration,
the method further comprises:
receiving from a base station a parameter ($W_{DAI}^{UL}$) about the number of downlink subframes fed back, and calculating a fourth quantity (N''') of downlink subframes to be fed back in the uplink subframes based on the parameter;
and in the implementing:
taking the smaller value of the third quantity ($M_c'''$) and the fourth quantity (N''') as the actual quantity ($B_c^{DL}$) of downlink subframes actually fed back;
implementing automatically retransmission feedback for the downlink subframes of the actual quantity ($B_c^{DL}$), in the physical uplink shared channel adjusted by the uplink grant;
wherein, the fourth quantity (N''') is calculated according to the following formula:

$$W_{DAI}^{UL}+4[U-W_{DAI}^{UL})/4],$$

wherein, $W_{DAI}^{UL}$ is the parameter, and U is the maximum quantity in the quantities of downlink subframes needing to be fed back for the primary cell and the scheduling secondary cell.

15. A method of claim 14, wherein, in the implementing:
taking the third quantity ($M_c'''$) as the actual quantity ($B_c^{DL}$) of downlink subframes actually fed back;
implementing automatically retransmission feedback for downlink subframes of the actual quantity ($B_c^{DL}$) in the physical uplink control channel or the physical uplink shared channel, not adjusted by the uplink grant, in the uplink subframes;

and/or, the reference frame configuration is any of the following:

type 0; type 1; type 2; type 3; type 4 and type 6;

the method further comprises:

receiving from a base station a parameter ($W_{DAI}^{UL}$) about the number of downlink subframes fed back;

and in the implementing:

taking the smaller value of the third quantity ($M_c'''$) and the parameter ($W_{DAI}^{UL}$) as the actual quantity ($B_c^{DL}$) of downlink subframes actually fed back;

implementing automatically retransmission feedback for downlink subframes of the actual quantity ($B_c^{DL}$) in the physical uplink shared channel adjusted by the uplink grant.

* * * * *